(12) United States Patent
Linde et al.

(10) Patent No.: US 10,994,493 B2
(45) Date of Patent: May 4, 2021

(54) METHOD AND APPARATUS FOR WELDING A THERMOSET OBJECT TO A FURTHER OBJECT VIA THERMOPLASTIC OUTER LAYERS

(71) Applicant: Airbus Operations GmbH, Hamburg (DE)

(72) Inventors: Peter Linde, Hamburg (DE); Brian Wardle, Lexington, MA (US)

(73) Assignee: AIRBUS OPERATIONS GMBH, Hamburg (DE)

(*) Notice: Subject to any disclaimer, the term of this patent is extended or adjusted under 35 U.S.C. 154(b) by 147 days.

(21) Appl. No.: 16/111,740

(22) Filed: Aug. 24, 2018

(65) Prior Publication Data

US 2019/0061273 A1 Feb. 28, 2019

(30) Foreign Application Priority Data

Aug. 25, 2017 (DE) ...................... 10 2017 119 491.6

(51) Int. Cl.
*B32B 41/00* (2006.01)
*B29C 65/34* (2006.01)
(Continued)

(52) U.S. Cl.
CPC ...... *B29C 65/3492* (2013.01); *B29C 65/3412* (2013.01); *B29C 65/3468* (2013.01);
(Continued)

(58) Field of Classification Search
CPC . B29C 65/3492; B29C 66/112; B29C 66/532; B29C 66/91221; B29C 66/131;
(Continued)

(56) References Cited

U.S. PATENT DOCUMENTS 8,741,082 B2 6/2014 Aussermeier
2011/0094671 A1 4/2011 Wang et al.
(Continued)

FOREIGN PATENT DOCUMENTS

DE         38 31 787 A1    4/1989
DE      102010007824 A1 *  8/2011  .......... B29C 66/723
DE    10 2010 003 440 A1   10/2011

OTHER PUBLICATIONS

German Search Report for Corresponding German Patent Application No. 10 2017 119 491.6; priority document.

*Primary Examiner* — Michael N Orlando
*Assistant Examiner* — Joshel Rivera
(74) *Attorney, Agent, or Firm* — Greer, Burns & Crain, Ltd.

(57) ABSTRACT

A method and an apparatus for welding a first object to a second object, wherein the first object is produced from a thermoset and comprises a thermoplastic material outer layer, wherein the second object comprises at least one thermoplastic material outer layer. In addition, a layer of carbon nanotubes is applied to the thermoplastic material outer layer of the first object, and the second object is placed onto the first object. At least some of the thermoplastic material outer layer of the second object lies atop the applied layer of carbon nanotubes. In addition, a potential is applied to the layer of carbon nanotubes, such that an electrical current flows through the carbon nanotubes, wherein the thermoplastic material outer layer of the first object and the thermoplastic material outer layer of the second object are heated and are welded to one another.

17 Claims, 4 Drawing Sheets

(51) Int. Cl.
*B29C 65/00* (2006.01)
*B29L 31/30* (2006.01)
*B29C 65/48* (2006.01)
*B29C 65/50* (2006.01)
*B29C 65/52* (2006.01)
*B29C 65/60* (2006.01)
*B29K 105/16* (2006.01)
*B29K 701/10* (2006.01)
*B29K 701/12* (2006.01)

(52) U.S. Cl.
CPC .......... *B29C 66/112* (2013.01); *B29C 66/131* (2013.01); *B29C 66/474* (2013.01); *B29C 66/524* (2013.01); *B29C 66/532* (2013.01); *B29C 66/723* (2013.01); *B29C 66/72141* (2013.01); *B29C 66/7392* (2013.01); *B29C 66/7394* (2013.01); *B29C 66/73921* (2013.01); *B29C 66/73941* (2013.01); *B29C 66/8244* (2013.01); *B29C 66/8362* (2013.01); *B29C 66/9121* (2013.01); *B29C 66/91221* (2013.01); *B29C 66/91653* (2013.01); *B29C 66/91655* (2013.01); *B29C 66/961* (2013.01); *B29C 65/3416* (2013.01); *B29C 65/3456* (2013.01); *B29C 65/4815* (2013.01); *B29C 65/5057* (2013.01); *B29C 65/526* (2013.01); *B29C 65/601* (2013.01); *B29C 66/1122* (2013.01); *B29C 66/21* (2013.01); *B29C 66/61* (2013.01); *B29C 66/71* (2013.01); *B29C 66/72323* (2013.01); *B29C 66/73115* (2013.01); *B29C 66/73751* (2013.01); *B29C 66/73752* (2013.01); *B29C 66/8618* (2013.01); *B29C 66/91313* (2013.01); *B29C 66/91315* (2013.01); *B29C 66/963* (2013.01); *B29K 2105/167* (2013.01); *B29K 2701/10* (2013.01); *B29K 2701/12* (2013.01); *B29L 2031/3076* (2013.01)

(58) Field of Classification Search
CPC .......... B29C 66/91655; B29C 65/3468; B29C 66/723; B29C 65/3412; B29C 66/73921; B29C 66/524; B29C 66/961; B29C 66/72141; B29C 66/474; B29C 66/8362; B29C 66/8244; B29C 66/73941; B29C 66/7392; B29C 66/7394; B29C 66/9121; B29C 66/91653; B29C 65/3416; B29C 66/963; B29C 66/1122; B29C 66/71; B29C 66/91313; B29C 66/8618; B29C 66/91315; B29C 66/73751; B29C 65/4815; B29C 65/5057; B29C 65/526; B29C 65/601; B29C 66/61; B29C 66/21; B29C 66/73115; B29C 66/72323; B29C 65/3456; B29C 66/73752; B29C 65/18; B29C 65/344; B29C 66/45; B29C 66/9141; B29L 2031/3076; B29K 2105/167; B29K 2701/10; B29K 2701/12
USPC ................... 156/60, 64, 350, 351, 378, 379
See application file for complete search history.

(56) References Cited

U.S. PATENT DOCUMENTS

2014/0078711 A1* 3/2014 Bolanos ................ B23K 20/10
361/820
2017/0165903 A1 6/2017 Linde

* cited by examiner

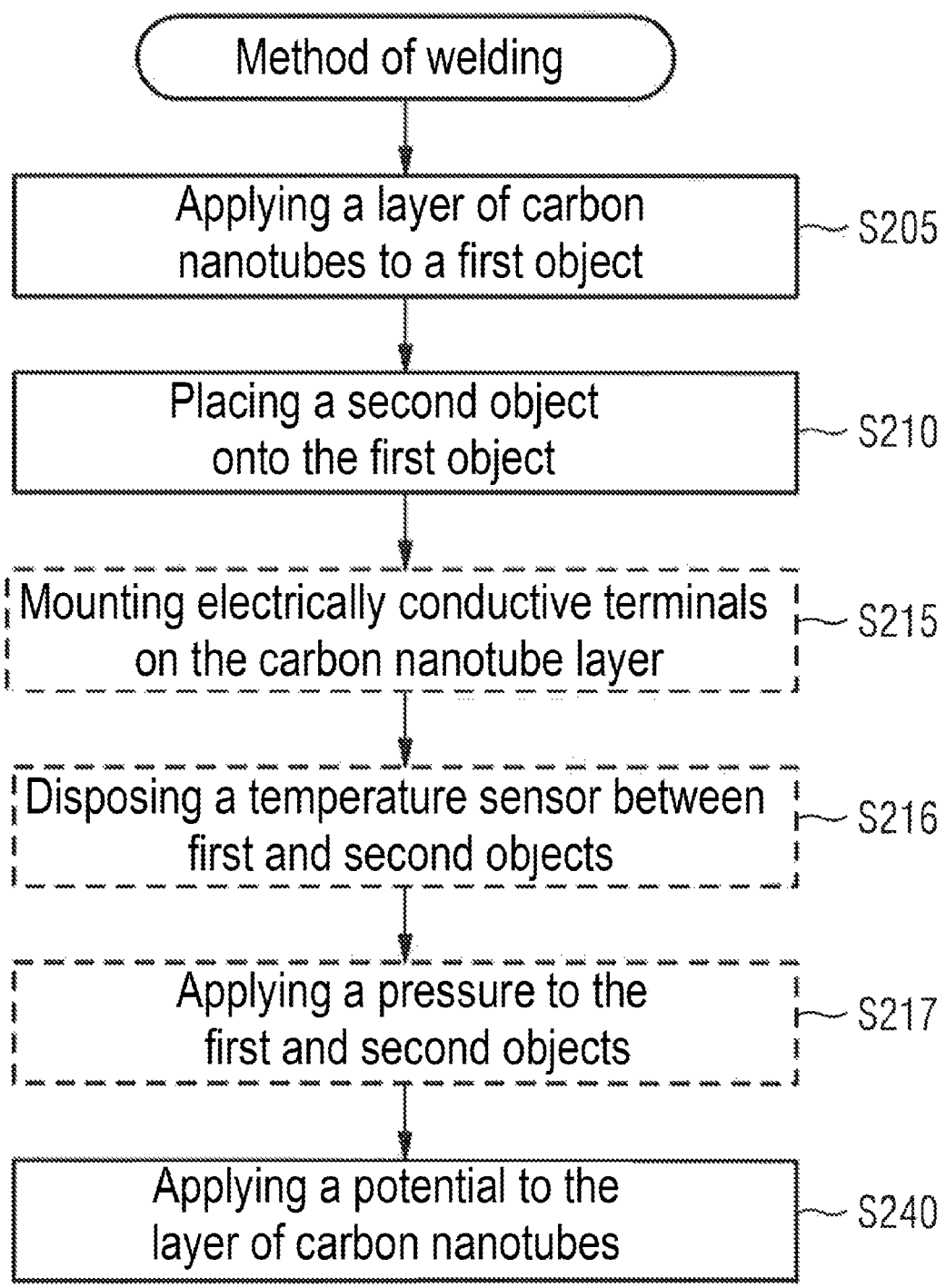

METHOD AND APPARATUS FOR WELDING A THERMOSET OBJECT TO A FURTHER OBJECT VIA THERMOPLASTIC OUTER LAYERS

CROSS-REFERENCES TO RELATED APPLICATIONS

This application claims the benefit of the German patent application No. 10 2017 119 491.6 filed on Aug. 25, 2017, the entire disclosures of which are incorporated herein by way of reference.

BACKGROUND OF THE INVENTION

The invention relates to a method and an apparatus for welding a first object to a second object. More particularly, the invention relates to a method and an apparatus for welding two objects, wherein a first of the objects has been produced from a thermoset and comprises an outer layer of a thermoplastic material, and a second of the objects comprises at least one outer layer of a thermoplastic material.

There is increasing use in industry of plastic materials for production of components and devices. More particularly, fiber-reinforced composite materials (fiber-reinforced plastics) are preferred over metallic materials owing to their lower weight and also their greater load-bearing capacity. For instance, even in aircraft construction, the use of fiber-reinforced composite materials, for example carbon fiber-reinforced plastic, is becoming ever more established.

In addition, fiber-reinforced plastic components produced on a thermoset basis are now approved for the production of the primary structure of an aircraft (the supporting structure of the aircraft) and therefore standard practice. A composite material produced on a thermoset basis is referred to hereinafter as "thermoset composite" or merely "thermoset." These thermoset composite materials are prefabricated by means of a synthetic resin and at least one weave layer impregnated by the synthetic resin. The synthetic resin cures in a chemical process, it being possible to achieve virtually any component shape. However, this curing operation is irreversible, which means that the component cannot be deformed again or changed in any other way after curing without adversely affecting the thermoset.

By contrast with the irreversible thermoset composite materials, thermoplastic composite materials are also used for production of components and devices. In aircraft construction too, thermoplastic composite materials are now being used. These offer the advantage that the underlying thermoplastic, after the component has been completed, can be deformed again by heating or else can be welded to another thermoplastic component. As well as better environmental compatibility compared to thermoset composite materials, thermoplastic composite materials also offer the advantage of better tolerance to damage. However, thermoplastic composite materials are much more costly than thermoset composite materials.

Owing to the irreversible production and forming process in the case of thermoset composite materials, two components produced from this material cannot be bonded to one another, for example welded, in such a simple manner as is possible in the case of thermoplastic composite materials. Therefore, thermoset composite materials, as shown in schematic form in FIG. 1, are joined by means of connectors. Thus, FIG. 1 shows a first component 110 and a second component 120 that overlap in a particular region. In the region of overlap, at least one connector 115 has been provided, which penetrates the two components 110, 120 and presses them against one another. A connector 115 may be executed, for example, as a screw/bolt with a nut or as a rivet.

Alternatively, two components made of thermoset composite material may also be adhesively-bonded to one another as shown in schematic form in FIG. 2. It is possible here to apply adhesive 116 to a component 110, for example by means of a nozzle, brush or paintbrush 117. A suitable adhesive is an epoxy-based adhesive (for example the adhesive with the type designation "FM 300"). The second component 120 is placed onto the first component 110 thus prepared and bonded. One or both of components 110, 120 may be bonded in the uncured state, in which case the bonding process can take place with the curing of the components in an autoclave.

Especially in the case of use of at least one uncured component 110, 120, adhesive bonding is very complex since the geometry of the adhesive 116 to be applied, but also the surface preparation of the two components and the curing process, has a crucial effect on the quality of the composite component. For example, too high a curing temperature can lead to delamination or other damage to the already cured component. The bonding of two already cured components 110, 120 is not envisaged for safety reasons for the manufacture of the primary structure of aircraft, since the primary bond thereof constitutes a possible weak point owing to the relatively poor material bonding of the two components to the adhesive.

SUMMARY OF THE INVENTION

It is an object of the invention to provide a method and an apparatus by means of which constructions assembled from at least two composite material objects (or components) can be manufactured inexpensively, and the mechanical properties thereof are impaired only slightly, if at all.

For this purpose, the invention teaches a method of welding a first object to a second object, wherein the first object has been produced from a thermoset and comprises an outer layer of a thermoplastic material, and wherein the second object comprises at least one outer layer of a thermoplastic material. In other words, the first object is a thermoset object comprising at least one irreversible section or body. It is possible to apply the outer layer of a thermoplastic material thereon directly or indirectly (i.e. with one or more interlayers). The thermoplastic outer layer, also referred to as thermoplastic veil, improves the mechanical properties of the thermoset object. For example, the ductility of the thermoset object is improved, which leads to attenuation of any propagation of damage and inhibition or slowing of delamination in the event of damage or overstress. Illustrative thermoset materials are designated M21E and M21EX.

The second object may comprise either entirely or partly of thermoplastic material(s), and so at least one outer layer comprises a thermoplastic material. It will be appreciated that the second object may also, like the first object, have been produced from a thermoset to which the outer layer comprising the thermoplastic material has been applied directly or indirectly.

The outer layer comprising the thermoplastic material of the first object and/or optionally of the second object may already have been applied prior to the curing of the part of the object that comprises thermoset. As a result, a finer and more complete chemical bond of the thermoset molecules and the thermoplastic molecules can be achieved than would be the case with application after curing of the thermoset. In this way too, the outer layer can be thinner than, for example, in the case of application of a thermoplastic layer to a cured thermoset object.

The method may comprise the following steps:

applying a layer of carbon nanotubes to the outer layer comprising the thermoplastic material of the first object;

placing the second object onto the first object, wherein at least part of the outer layer comprising the thermoplastic material of the second object rests on the layer of carbon nanotubes applied; and applying a potential to the layer of carbon nanotubes, such that an electrical current flows through the carbon nanotubes, wherein the outer layer comprising the thermoplastic material of the first object and the outer layer comprising the thermoplastic material of the second object are heated and are welded to one another.

The carbon nanotubes may be applied to the first object with the aid of a solvent. Subsequently, the solvent can evaporate and leave a thin layer of carbon nanotubes (i.e., a layer comprising carbon nanotubes) on the first object. Alternatively or additionally, the carbon nanotubes can also first be packed to form a paper-like structure, called "bucky paper," which is then applied to the first object. This paper-like structure is likewise produced with the aid of a solvent in which the carbon nanotubes are present, and the carbon nanotubes ultimately hang together like fibers.

The layer of carbon nanotubes thus produced may comprise a small number of superposed carbon nanotubes and thus have an exceptionally low layer thickness. A carbon nanotube has a diameter of about 1 nm, and so the layer of carbon nanotubes produced has a layer thickness of about 2 to 10 nm. More particularly, a layer thickness of 2 to 5 mm can be achieved, which is sufficient to heat the two thermoplastic materials and weld them to one another.

In addition, the layer of carbon nanotubes can bring about a continuous coating of the outer layer of the first object with carbon nanotubes. Alternatively, the carbon nanotubes may be applied in a linear manner and/or in the form of a grid (with straight or curved lines). It will be appreciated that the carbon nanotubes can be applied in any desired form on the first object and/or the second object.

In one configuration, a further layer of carbon nanotubes may be applied on the second object, and especially on the outer layer comprising the thermoplastic material of the second object. After the second object has been placed onto the first object, the two layers of carbon nanotubes may lie against one another, as a result of which they collectively serve as current conductors. For example, the two layers of carbon nanotubes on the first object and the second object may be applied in a linear manner or in the form of a grid and, after the second object has been placed onto the first object, come to rest against one another such that they together form a grid structure (or a finer grid with smaller distances between grid lines).

Owing to the flow of current through the layer of carbon nanotubes, heat is generated exactly at the point where the first and second objects are to be welded to one another. In the case of more complex components, individual bonds can also be established successively, for example by successive establishment of multiple regions with a carbon nanotube layer and/or by successive application of the potential to different parts of the carbon nanotube layer (regions).

In one configuration, the outer layer comprising the thermoplastic material of the first object and the outer layer comprising the thermoplastic material of the second object can be heated by remote Joule heating owing to the electrical current flowing through the layer of carbon nanotubes. By contrast with heating on the basis of the Joule effect, in which the material through which the current flows itself produces waste heat owing to the current flow, the current flow through the carbon nanotubes in the case of remote Joule heating causes atoms of the material surrounding the carbon nanotubes to oscillate more rapidly. This increases the temperature of the material surrounding the carbon nanotubes, while the carbon nanotubes themselves do not undergo any heating as a result of the current flow.

Remote Joule heating enables very precise and efficiently controllable heating in a very small region around the carbon nanotubes. As a result, the outer layers comprising the thermoplastic material of the first and second objects (that lie against one another and surround the carbon nanotubes) can be heated and melted. As a result of mixing of the layers and subsequent cooling, the two outer layers comprising the thermoplastic material of the first and second objects are welded to one another.

The flow of current in the layer of carbon nanotubes allows the surrounding material to be heated to up to 500° C. According to the type of thermoplastic material in the outer layers of the first and second objects to be welded, the welding temperature to be achieved is between 320° C. and 400° C. At the welding temperature to be achieved, the thermoplastic material is softened or even liquefied by the heating, as a result of which the thermoplastic molecules of the layers of the respective objects to be welded mix with one another and form a uniform joined layer of thermoplastic material. For example, it is possible to use high-temperature thermoplastics as qualified for aircraft construction—especially for manufacture of the primary structure. These thermoplastics include PEEK (polyetheretherketone) having a melting temperature of about 380° C., where the welding temperature can be set at about 400° C. (+/−10° C.). In addition, it is also possible to use PEKK (polyetherketoneketone) as a thermoplastic. The melting temperature here is between 320° C. and 370° C., according to the type used. In the case of standard types of PEKK, the melting temperature is 350° C. to 370° C. and the welding temperature is correspondingly somewhat higher (about 5 to 20° C. higher).

The heating of the thermoplastic material that is generated in this operation is effected directly at the surfaces of the first and second objects that lie against one another and are to be welded, since the layer of carbon nanotubes is present at these surfaces. By precise control of the current flow and hence of the heating, a transition region of the outer layer comprising the thermoplastic material of the first object to the part comprising the thermoset of the first object can undergo only a slight alteration in temperature, if any. In other words, the outer layer comprising the thermoplastic material of the first object is heated and melted only on the side to be welded, whereas the opposite side of the layer remains cold or at least solid. This firstly prevents the part comprising the thermoset of the first object from being damaged owing to heating, as is the case in conventional welding methods in which the entire component or at least a relatively large portion thereof is heated. On the other hand, the thermoplastic material that has established a bond at the molecular level with the part comprising the thermoset of the first object is not melted again, for example during the curing of the part comprising the thermoset of the first object, as a result of which this bond is not impaired.

The same also applies to the second object, irrespective of the material from which it has been produced. For instance, the second object may also have been produced from a thermoset. In other words, at least some of the second object has been manufactured from a thermoset, and the second object still includes the outer layer comprising the thermoplastic material. Use of a second object produced from thermoset allows the component produced from the first and second objects to be produced less expensively, since thermoset objects are less costly to manufacture than pure thermoplastic objects, for example. In aircraft construction, components made from thermoset objects are approved, and so distinct savings are enabled here.

If the second object also includes a part manufactured from thermoset, this part of the second object is not heated during the welding and hence not damaged. In the case of other materials in the second object, for example thermoplastic materials, it is also beneficial to quality when these are not heated (again) during the welding. It is possible to heat thermoplastic materials repeatedly in order to change the shape of the object or to enable welding to another object. However, even in the case of thermoplastic materials, heating and cooling cycles have a slightly adverse effect on material properties. The shape of the second object, and especially of the thermoplastic components of the second object, can likewise be better conserved when only an extremely small region of the substrate to be welded is heated (melted).

In a further configuration, the first object and/or the second object may comprise a composite material. For example, one or more fibers may be integrated within the first and/or second object. It is also possible for one or more woven sheets to have been impregnated, formed and cured with a thermoset (to give a thermoset composite) or with a thermoplastic material, in order to produce part of the first and/or second object.

Alternatively or additionally, the outer layer comprising the thermoplastic material of the first object and/or the outer layer comprising the thermoplastic material of the second object may each have a layer thickness between 10 and 20 µm. This thermoplastic veil is sufficiently thick especially in the case of welding by means of the remote Joule effect, since only few layers of atoms or molecules of the thermoplastic material have to be heated and welded.

The amount of thermoplastic material heated for welding in the two outer layers of the first and second objects that brings about the actual welding of the first and second object is a few molecule thicknesses. It is therefore only about 1 to 10 µm. This reduces the influence on the other sections and parts of the first and second objects to a minimum. Alternatively, it is also possible for the entire thickness of the outer layers of thermoplastic material of the first and second objects to be welded.

In a further configuration, the process may further comprise the step of mounting electrically conductive terminals onto the layer of carbon nanotubes. These electrically conductive terminals may be implemented in the form of metal foils that are mounted in an electrically conductive manner onto the carbon nanotubes. For example, the terminals may be adhesive-bonded or welded in an electrically conductive manner to the carbon nanotubes. The electrically conductive terminals may bring about or constitute an extension of the layer of carbon nanotubes outside the first and/or second object. Thus, the applying of a potential may comprise applying of the potential to the electrically conductive terminals. The electrically conductive terminals may especially be mounted at two opposite sides or ends of the layer of carbon nanotubes. On the basis of the arrangement of the electrically conductive terminals, it is possible to determine the flow of current through the layer of carbon nanotubes, which means that it is also possible to use different regions of the layer of carbon nanotubes successively for welding.

In addition, the method may comprise the step of applying pressure to the first object and the second object, such that the at least one part of the outer layer comprising the thermoplastic material of the second object that lies atop the applied layer of carbon nanotubes is pressed onto the outer layer comprising the thermoplastic material of the first object. In other words, the first object and the second object are pressed against one another such that the outer layers of the first and second object that are to be welded are pressed against one another. This improves the bond of the outer layers of the first and second object that are to be welded and hence the quality of the weld seams or weld regions.

For example, the applying of the pressure may comprise arranging at least one magnetic component and a further component magnetically attracted by the at least one magnetic component on opposite sides of the first object and of the second object. In this case, the at least one magnetic component and the further component press the first object and the second object against one another.

In one configuration, one magnetic component is provided in the form of one or more rolls that are drawn across the first or second object. There is a permanent magnet or electromagnet within the roll(s). The other of the first and second objects may be accommodated within or lie atop a further magnetic component. If the one or more magnetic rolls are now drawn across the first or second object, the two magnetic components can attract one another and press the first and second objects together. The two magnetic components should, if at all possible, be arranged such that the pressing force that they generate acts essentially perpendicularly to the two outer layers of the first and second objects that are to be welded to one another.

By comparison with previous welding methods in which the first and second objects have to be introduced into an autoclave and/or vacuum pouch, the welding method described here is much simpler and more time-saving and permits better laminar alignment of the two objects with respect to one another during the welding.

In yet a further configuration, the method may comprise the step of disposing at least one temperature sensor atop and/or within the layer of carbon nanotubes. For example, the at least one temperature sensor may be applied in the form of a very thin film sensor together with the layer of carbon nanotubes or thereafter. Alternatively or additionally, at least one temperature sensor may be disposed atop and/or within the outer layer comprising the thermoplastic material of the first object and/or the second object. For example, at least one temperature sensor may be disposed on a side opposite the side of the outer layer to be welded, comprising the thermoplastic material, of the first and/or the second object. This can already be effected prior to application of the outer layer comprising the thermoplastic material. Alternatively or additionally, at least one temperature sensor may be applied to the outer layer comprising the thermoplastic material of the first and/or second object before the layer of carbon nanotubes is applied.

According to the arrangement of the one or more temperature sensors, it is possible to detect a temperature profile during the welding in layer thickness direction of the outer layer comprising the thermoplastic material. It is thus possible to monitor whether the transition region between the thermoplastic material of the outer layer and the further material of the first or second object is being heated during the welding. It is likewise possible to monitor a temperature profile in the lengthwise and widthwise direction of the outer layers of the first or second object and the layer of carbon nanotubes (i.e., within the planes in which the layers extend). More particularly, it is possible to monitor whether the temperature profile is very substantially uniform.

The invention further teaches an apparatus for welding a first object to a second object, wherein the first object has been produced from a thermoset and comprises an outer layer of a thermoplastic material, wherein the second object comprises at least one outer layer of a thermoplastic material. The production and composition of the first object and of the second object may correspond to the production and composition described for the method taught.

The apparatus here may comprise a holding element set up to accommodate and to hold the first object, wherein the second object has been placed onto the first object. The holding element may, like a casting mold, have a shape corresponding to the first object, such that it lies essentially flush with at least one side or surface in the holding element.

In addition, the holding element may be set up such that the outer layer comprising the thermoplastic material of the first object is exposed. As a result, at least part of the outer layer comprising the thermoplastic material of the second object may lie atop the outer layer comprising the thermoplastic material of the first object. In between, i.e., atop the outer layer comprising the thermoplastic material of the first object, a layer of carbon nanotubes has been applied, such that the at least part of the outer layer comprising the thermoplastic material of the second object lies atop the layer of carbon nanotubes.

In addition, the apparatus may have at least one power terminal set up to apply a potential to the layer of carbon nanotubes. For example, the apparatus may have one or more electrically conductive cables and/or terminal clamps. On application of a potential to the layer of carbon nanotubes through the at least one power terminal, an electrical current flows through the carbon nanotubes, wherein the outer layer comprising the thermoplastic material of the first object and the outer layer comprising the thermoplastic material of the second object are heated and are welded to one another.

The heating and welding is effected by one of the variants and configurations described for the method taught.

In addition, the device may further comprise a press mold set up to press the second object onto the first object. The press mold may have a shape corresponding to the shape of the second object on the opposite side from the outer layer comprising the thermoplastic material, i.e., like a casting mold or part thereof. Thus, the press mold may press the second object onto the first object without any change in the position of the second object.

Alternatively or additionally, the press mold may be configured in the form of a roll. The roll may be set up to be drawn across the first or second object, pressing the first or second object onto the correspondingly other first or second object.

In addition, the press mold may comprise a permanent magnet or electromagnet that interacts with a corresponding permanent magnet or electromagnet disposed within the holding element. More particularly, the magnets in the press mold and the holding element may attract one another, such that the first and second objects are pressed against one another without further external influences.

Alternatively or additionally, the press mold or the holding element may comprise a magnetically active material which is attracted by a magnet in the other of the press mold and holding element.

In addition, the holding apparatus may contain a magnetically active material or a magnet that extends over the entire length of the holding apparatus along which the press mold, for example in the form of a roll, is moved.

In a further configuration, the apparatus may further comprise a power source set up to connect the at least one power terminal and to provide the electrical current that flows through the carbon nanotubes. The power source may be a battery, an inverter, or another commonly used industrial power terminal.

In addition, the apparatus may further comprise a controller set up for closed-loop control of the electrical current provided by the power source in such a way that the outer layer comprising the thermoplastic material of the first object and the outer layer comprising the thermoplastic material of the second object are heated and are welded to one another. According to the arrangement of the at least one power terminal and the configuration of the layer of carbon nanotubes (for example carbon nanotubes arranged in a linear manner or in the form of a grid), the controller can successively weld different regions of the outer layers comprising the thermoplastic material of the first and second objects to one another. It will be appreciated that the entire layer of carbon nanotubes may also be essentially simultaneously heated and the entire area of intersection between the first and second objects may be welded.

For this purpose, the apparatus may additionally or alternatively have one or more temperature sensors and/or comprise carbon nanotubes in the layer. For instance, the controller can receive signals from the temperature sensor or multiple temperature sensors and control the electrical current provided by the power source on the basis of the signals received. As a result, the welding temperature required can be achieved only for the necessary period of time, such that the thermoplastic material of the outer layers of the first and second objects is fused (welded) together.

Alternatively or additionally, the device may comprise one or more temperature sensors atop and/or within the outer layer comprising the thermoplastic material of the first object and/or second object. The controller here may be set up to receive a signal from the temperature sensor or multiple temperature sensors and to control the electrical power provided by the power source as a function of the signal from the temperature sensor. For instance, the electrical power provided by the power source can be downregulated if too high a temperature is measured in a transition region between the outer layer comprising the thermoplastic material of the first and/or second object and a section further inside the first or second object (i.e., the side remote from the side of the outer layer to be welded). This can prevent damage as a result of heating on already formed and cured parts of the first and/or second object.

BRIEF DESCRIPTION OF THE DRAWINGS

There follows a detailed description of working examples of the invention with reference to the drawings.

FIG. 6 shows a flow diagram in a method of welding a first object to a second object.

DETAILED DESCRIPTION OF THE
PREFERRED EMBODIMENTS

In the invention described here, a method and an apparatus for welding a first object to a second object are envisaged. The first object may be a thermoset composite object. In other words, the first object may have been produced at least partly from a thermoset.

Figure 1:
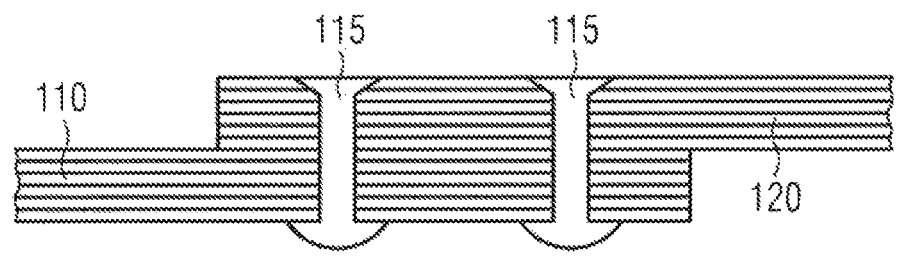
FIG. 1 shows a schematic of components made of composite material that have been joined by means of connectors according to the prior art.
Figure 2:
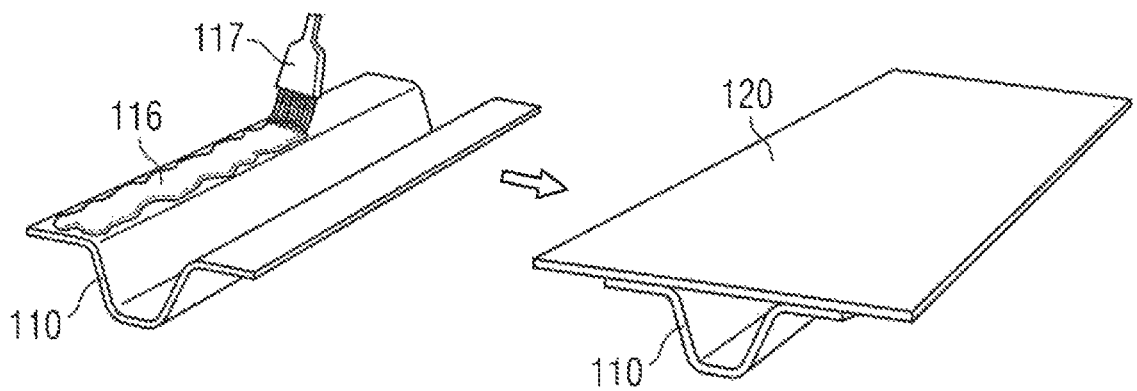
FIG. 2 shows a schematic of adhesive bonding for joining of two components made of composite material according to prior art.
Figure 3:
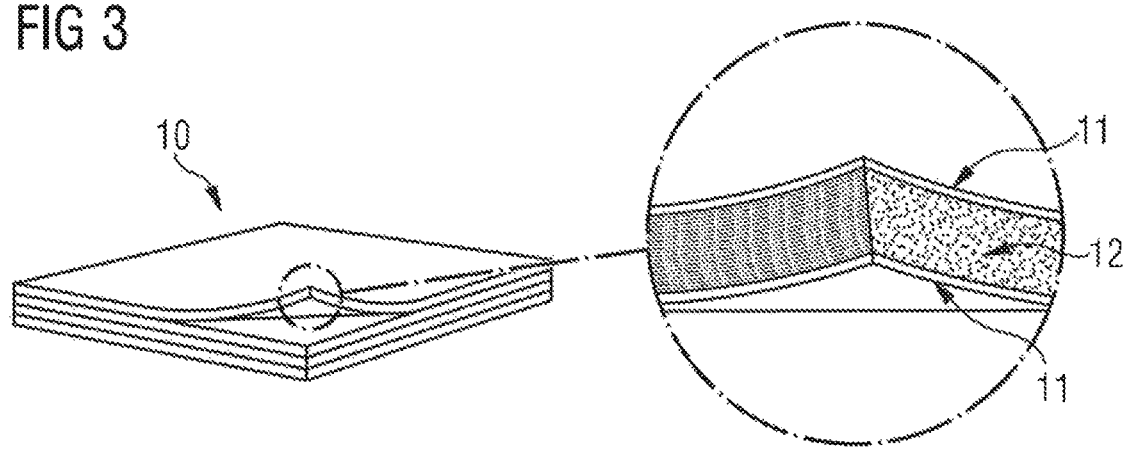
FIG. 3 shows a schematic of the construction of a thermoset composite object.

FIG. 3 shows a schematic of the construction of such a thermoset composite object 10. This comprises a fiber-reinforced core 12 manufactured, for example, from one or more woven sheets and a thermoset. An outer layer 11 of a thermoplastic material has been applied on at least one side or surface of the core 12. Such an outer layer 11 of a thermoplastic material improves the mechanical properties of the object 10, especially in the event of damage. For example, an outer layer 11 of a thermoplastic material prevents or at least inhibits the delamination that typically takes place after impact of another object on the thermoset.

The one or two layers 11 of the thermoplastic material may be between 10 and 20 µm in thickness. Even such thin layers contribute to improvement of the mechanical properties of the object 10.

Figure 4:
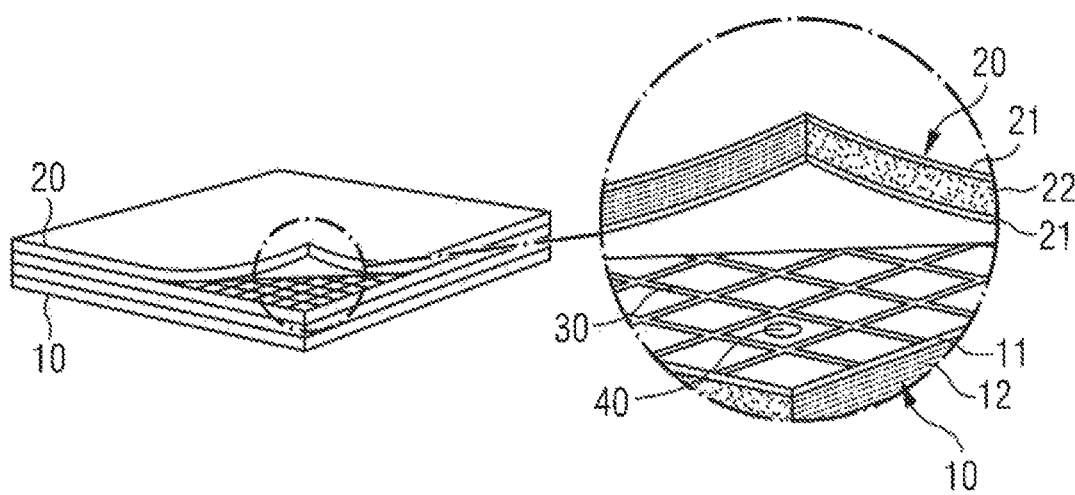
FIG. 4 shows a schematic of the arrangement of two thermoset composite objects prior to welding thereof.

FIG. 4 shows a schematic of the arrangement of two such thermoset composite objects 10 and 20 before the two objects 10 and 20 are welded to one another. The objects 10 and 20 shown in FIG. 4 are shown with a layer 11 and 21 of a thermoplastic material on both sides. It is sufficient, however, that the surfaces (layers) to be welded of the objects 10 and 20 comprise a thermoplastic material. For instance, at least one of the objects, for example the object 20, may also have been produced entirely from a thermoplastic material (with or without fiber reinforcement). If the first object 10 and the second object 20 are each a thermoset composite object, it is possible to inexpensively manufacture the component to be produced from the two objects 10, 20.

A layer of carbon nanotubes 30 has been applied at least atop the outer layer 11 comprising the thermoplastic material of the first object 10. The carbon nanotubes 30 may be applied to the first object 10 via a solution (solvent) or as a film or as "bucky paper." The shape of the carbon nanotubes 30 may be as desired, provided that a two-dimensional region of the first object 10, for example a linear profile of the carbon nanotubes 30 or one in the form of a grid, has been very substantially covered.

It will be appreciated that the layer of carbon nanotubes 30 may be applied to the second object 20, and especially to its layer 21 comprising a thermoplastic material that faces the first object 10. Alternatively, one layer of carbon nanotubes 30 each may be applied to the first object 10 and the second object 20 atop their respective outer layers 11, 21 that face one another and are to be welded to one another.

A potential may be applied to the layer of carbon nanotubes 30, such that an electrical current flows through the carbon nanotubes 30. This is effected in a state in which the respective outer layers 11, 21 of the first object 10 or second object 20 lie atop and against one another. FIG. 4 shows, for illustration of the layer construction, the second object 20 parted from the first object 10. For welding of the two objects 10, 20, they must of course lie against one another. Owing to the current flow through the carbon nanotubes 30, the thermoplastic material of the outer layer 11 of the first object 10 and the thermoplastic material of the outer layer 21 of the second object 20 are heated (softened and/or liquefied), which welds the two layers 11, 21 to one another.

In addition, a temperature sensor 40 may be disposed atop and/or within the layer of carbon nanotubes 30, and/or atop and/or within the outer layer 11, 21 comprising the thermoplastic material of the first object 10 and/or second object 20. According to the position, a temperature in a corresponding layer of the composite of the first object 10 and of the second object 20 can thus be measured and evaluated. It is likewise possible to evaluate the temperature over a region within a plane of one of the outer layers 11, 21 of the first object 10 and of the second object 20 or of the layer of carbon nanotubes 30.

Figure 5:
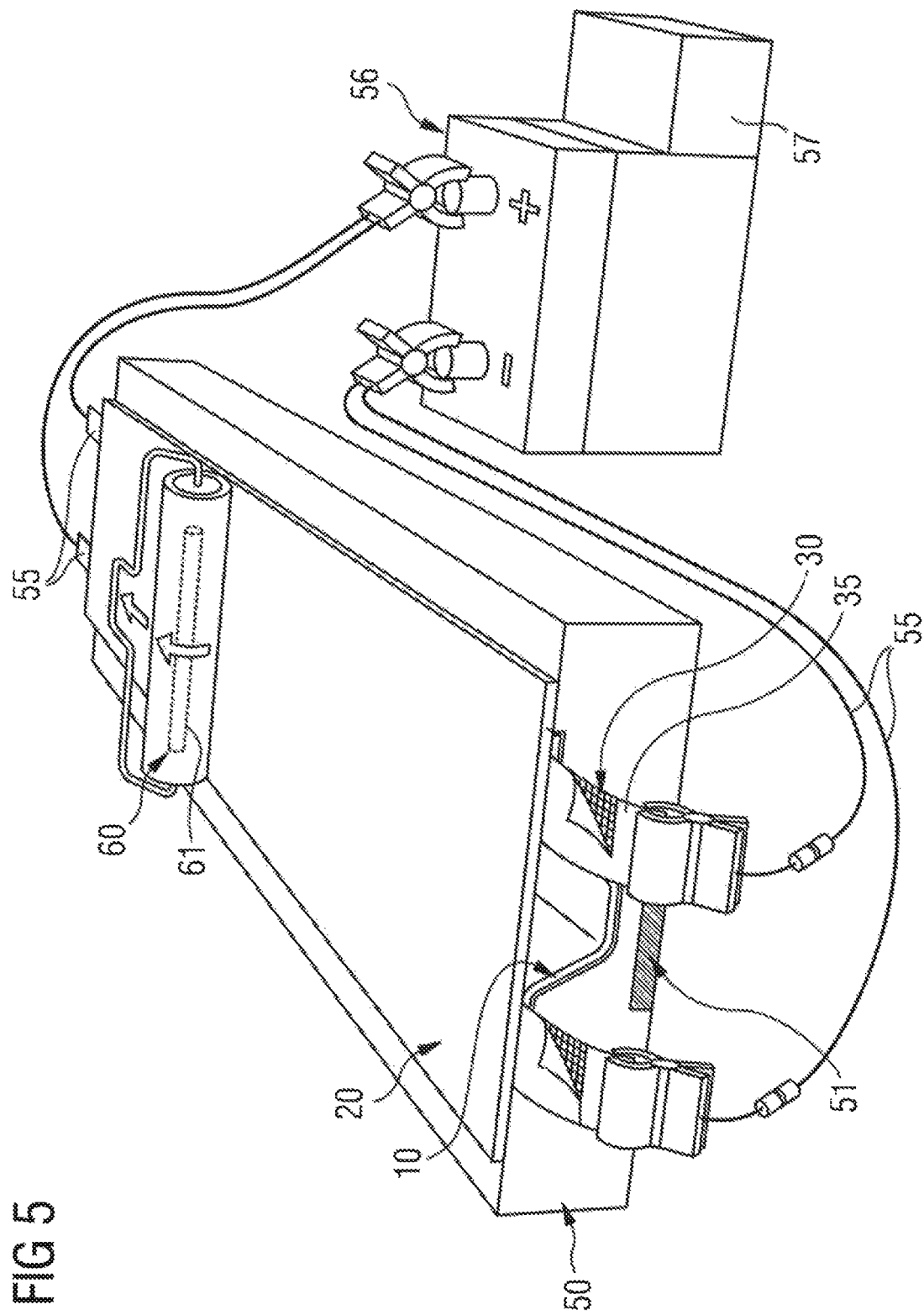
FIG. 5 shows a schematic of an apparatus for welding a first object to a second object.

FIG. 5 shows a schematic of an apparatus for welding the first object 10 to the second object 20. This apparatus comprises a holding element 50 set up to accommodate and to hold the first object 10. For this purpose, the holding element 50 has a shape corresponding to that of the first object 10, such that the first object 10 is reliably fixed. The second object 20 has been placed atop the first object 10. More particularly, the two outer layers 11, 21 to be bonded of the first object 10 and second object 20 lie against one another, with the layer of carbon nanotubes 30 in between. FIG. 5 shows, by way of example, a stringer 10 for an aircraft onto which a skin 20 (for example, outer skin of the aircraft) is being welded.

The apparatus further comprises a power terminal 55 set up to apply a potential to the layer of carbon nanotubes 30. The power terminal 55 may, for example, comprise one or more cables, terminal clamps, electrical connectors, etc. The power connection 55 connects the layer of carbon nanotubes 30 to a power source 56. In order for a current to flow through the carbon nanotubes 30, the power connection 55 connects opposite sides of the layer of carbon nanotubes 30 or of the first and second objects 10, 20 to different poles of the power source 56.

For simple connection of the power terminal 55 to the carbon nanotubes 30, electrically conductive terminals 35 may be mounted on the layer of carbon nanotubes 30, to which, in turn, the power terminal 55 is connected. The electrically conductive terminals 35 may protrude from the assembled component comprising the first and second objects 10, 20 in order to enable simple connection of the power terminal 55. For example, a foil 35 with an electrical conductor may be mounted at an edge of the layer of carbon nanotubes 30, such that the foil 35 is readily accessible. Carbon nanotubes 30 may likewise be disposed atop or within the foil 35 in a corresponding manner to the layer of carbon nanotubes 30 between the first and second objects 10, 20.

In addition, the apparatus may include a press mold 60 set up to press the second object 20 onto the first object 10. The compression force applied by the press mold 60 may be based, for example, exclusively on the mass of the press mold 60. In addition, the press mold 60 may have been equipped with a magnet 61. The magnet 61 may interact with a corresponding magnet 51 in the holding element 50 in such a way that they attract one another and press the first and second objects 10, 20 together.

In addition, one or both of the magnets 51, 61 may take the form of a permanent magnet or electromagnet. Alternatively, rather than one of the two magnets 51, 61, a magnetic element may be provided, which is attracted by the magnet 51, 61 in the holding element 50 or press mold 60. Likewise alternatively, the holding element 50 or press mold 60 may also be magnetic and may be attracted by a magnet 51, 61 in the other component (holding element 50 or press mold 60).

Alternatively or additionally, the press mold may also be configured in the form of a vacuum pouch that encloses the first and second objects 10, 20 and, when a vacuum is established in the pouch, presses the two objects 10, 20 together. Likewise alternatively or additionally, a further press mold may be applied essentially completely atop the second object 20. In a corresponding manner to the holding element 50, the second object 20 can thus be pressed completely onto the first object 10 by the press mold 60.

Finally, the apparatus comprises a controller 57 set up to control the electrical current provided by the power source such that the outer layer 11 comprising the thermoplastic material of the first object 10 and the outer layer 21 comprising the thermoplastic material of the second object 20 are heated and welded to one another. For this purpose, the controller 57 can detect a potential profile and/or current profile through the layer of carbon nanotubes 30 and evaluate it (for example with the aid of reference values).

Alternatively or additionally, one or more temperature sensors 40 (FIG. 4) may also be disposed in the region of the outer layers 11, 21 to be welded, the signals from which are detected and evaluated by the controller 57. As soon as a welding temperature for the thermoplastic material has been achieved for the necessary period of time, the controller 57 can stop the current flow through the carbon nanotubes 30. Subsequently, the thermoplastic material cools down, and the two layers 11, 21—and hence the objects 10, 20—have been welded to one another.

FIG. 6 shows a flow diagram in a method of welding a first object 10 to a second object 20, wherein the first object 10 has been produced from a thermoset 12 and comprises an outer layer 11 of a thermoplastic material. The second object 20 comprises at least one outer layer 21 that likewise comprises a thermoplastic material.

In a first step S205, a layer of carbon nanotubes 30 is applied to the outer layer 11 comprising the thermoplastic material of the first object 10. Alternatively or additionally, in step S205, the layer of carbon nanotubes 30 may be applied to the outer layer 21 comprising the thermoplastic material of the second object 20.

In a further step S210, the second object 20 is placed onto the first object 10. The second object 20 is placed here onto the first object 10 in such a way that at least part of the outer layer 21 comprising the thermoplastic material of the second object 20 lies atop the layer of carbon nanotubes 30 applied.

An optional step S215 provides for mounting of electrically conductive terminals 35 onto the layer of carbon nanotubes 30. The electrically conductive terminals 35 serve to extend the layer of carbon nanotubes 30 in a region outside the first and/or second object 10, 20 for easier connection of the carbon nanotubes 30 to a power source 56.

Likewise optionally, in step S216, at least one temperature sensor 40 may be disposed atop and/or within the layer of carbon nanotubes 30, and/or atop and/or within the outer layer 11, 21 comprising the thermoplastic material of the first object 10 and/or second object 20. The at least one temperature sensor 40 serves to determine a temperature or a temperature profile within the layers 11, 21 to be welded and/or within the material of the first or second object 10, 20 surrounding the layers 11, 21 to be welded.

Step S216 may be conducted, for example, in the first production of a component consisting of the first and second objects 10, 20, i.e., in the production of a prototype. The temperatures measured by the at least one temperature sensor 40 during the welding of the first object 10 to the second object 20 and the corresponding potential and/or current profile can be stored and evaluated. In the case of components comprising a first and second object 10, 20 that are to be produced subsequently and have been manufactured essentially identically, it is possible to dispense with step S216 (the mounting of at least one temperature sensor 40) and to employ the stored potential and/or current profile for welding of the first and second objects 10, 20.

According to the configuration and especially weight of the first and second objects 10, 20, in a further optional step S217, a pressure may be applied to the first object 10 and/or the second object 20, such that the at least part of the outer layer 21 comprising the thermoplastic material of the second object 20 that lies atop the layer of carbon nanotubes 30 applied is pressed onto the outer layer 11 comprising the thermoplastic material of the first object 10. This assures a secure bond of the two outer layers 11, 21 of the first and second objects 10, 20.

Finally, in a step S220, a potential is applied to the layer of carbon nanotubes 30, such that an electrical current flows through the carbon nanotubes 30. The flow of current through the carbon nanotubes 30 brings about heating and welding of the outer layer 11 comprising the thermoplastic material of the first object 10 and the outer layer 21 comprising the thermoplastic material of the second object 20. The application of a potential may include application of the potential to the electrically conductive terminals 35.

In an alternative configuration, steps S217 and S220 may also be conducted in the reverse sequence. Likewise alternatively, the two steps S217 and S220 may be executed simultaneously.

It should finally be pointed out more particularly that the above-discussed variants, configurations and working examples serve merely for description of the teaching claimed, but do not restrict it to the variants, configurations and working examples.

The invention claimed is:

1. A method of welding a first object to a second object, wherein the first object has been produced from a thermoset and comprises an outer layer of a thermoplastic material, wherein the second object comprises at least one outer layer of a thermoplastic material, and wherein the method comprises:

applying a layer of carbon nanotubes to the outer layer comprising the thermoplastic material of the first object;

disposing at least one temperature sensor within the outer layer comprising the thermoplastic material of the first object;

placing the second object onto the first object, wherein at least part of the outer layer comprising the thermoplastic material of the second object rests on the layer of carbon nanotubes applied;

applying a pressure to the first object and the second object, such that the at least one part of the outer layer comprising the thermoplastic material of the second object that lies atop the applied layer of carbon nanotubes is pressed onto the outer layer comprising the thermoplastic material of the first object, wherein the applying of the pressure comprises arranging at least one magnetic component and a further component magnetically attracted by the at least one magnetic component on opposite sides of the first object and of the second object, wherein the at least one magnetic component and the further component press the first object and the second object against one another; and applying a potential to the layer of carbon nanotubes, such that an electrical current flows through the carbon nanotubes, wherein the outer layer comprising the thermoplastic material of the first object and the outer layer comprising the thermoplastic material of the second object are heated and are welded to one another.

2. The method according to claim 1, wherein the outer layer comprising the thermoplastic material of the first object and the outer layer comprising the thermoplastic material of the second object are heated by remote Joule heating due to the electrical current flowing through the layer of carbon nanotubes.

3. The method according to claim 1, wherein the second object has at least partly been produced from a thermoset.

4. The method according to claim 1, wherein at least one of the first object or the second object comprise a composite material.

5. The method according to claim 1, wherein at least one of the thermoplastic material of the first object or the thermoplastic material outer layer of the second object each have a layer thickness between 10 and 20 μm.

6. The method according to claim 1, further comprising:
mounting electrically conductive terminals onto the layer of carbon nanotubes,
wherein the applying of a potential comprises applying the potential to the electrically conductive terminals.

7. The method according to claim 1, further comprising:
disposing at least one temperature sensor atop the layer of carbon nanotubes.

8. A method of welding a first object to a second object, wherein the first object has been produced from a thermoset and comprises an outer layer of a thermoplastic material, wherein the second object comprises at least one outer layer of a thermoplastic material, and wherein the method comprises:
applying a layer of carbon nanotubes to the outer layer comprising the thermoplastic material of the first object;
disposing at least one temperature sensor within the layer of carbon nanotubes;
placing the second object onto the first object, wherein at least part of the outer layer comprising the thermoplastic material of the second object rests on the layer of carbon nanotubes applied; and
applying a potential to the layer of carbon nanotubes, such that an electrical current flows through the carbon nanotubes, wherein the outer layer comprising the thermoplastic material of the first object and the outer layer comprising the thermoplastic material of the second object are heated and are welded to one another.

9. The method according to claim 1, further comprising:
disposing at least one temperature sensor atop the outer layer comprising the thermoplastic material of the first object.

10. The method according to claim 1, further comprising:
disposing at least one temperature sensor atop the outer layer comprising the thermoplastic material of the second object.

11. The method according to claim 1, further comprising:
disposing at least one temperature sensor within the outer layer comprising the thermoplastic material of the second object.

12. An apparatus for welding a first object to a second object, wherein the first object has been produced from a thermoset and comprises an outer layer of a thermoplastic material, wherein the second object comprises at least one outer layer of a thermoplastic material, and wherein the apparatus comprises:
a holding element set up to accommodate and to hold the first object, wherein the second object has been placed onto the first object, and wherein at least part of the outer layer comprising the thermoplastic material of the second object lies atop a layer of carbon nanotubes applied to the outer layer comprising the thermoplastic material of the first object, the holding element comprising at least one magnetic component, and a press mold comprising a further magnetic component attracted by the at least one magnetic component on opposite sides of the first object and of the second object, wherein the at least one magnetic component and the further magnetic component are configured to press the first object and the second object against one another;
a temperature sensor at least one of atop or within the layer of carbon nanotubes; and
at least one power terminal set up to apply a potential to the layer of carbon nanotubes, such that an electrical current flows through the carbon nanotubes, wherein the outer layer comprising the thermoplastic material of the first object and the outer layer comprising the thermoplastic material of the second object are heated and are welded to one another.

13. The apparatus according to claim 12, further comprising:
a press mold set up to press the second object onto the first object.

14. The apparatus according to claim 12, further comprising:
a power source set up to connect to the at least one power terminal, and to provide the electrical current that flows through the carbon nanotubes.

15. The apparatus according to claim 14, further comprising:
a controller set up for closed-loop control of the electrical current provided by the power source such that the outer layer comprising the thermoplastic material of the first object and the outer layer comprising the thermoplastic material of the second object are heated and are welded to one another.

16. The apparatus according to claim 15, wherein the controller is set up to receive a signal from the temperature sensor and for closed-loop control of the electrical current provided by the power source as a function of the signal from the temperature sensor.

17. The apparatus according to claim 15, wherein the controller is set up to receive a signal from the temperature sensor and for closed-loop control of the electrical current provided by the power source as a function of the signal from the temperature sensor.

* * * * *